United States Patent
Ahn

(10) Patent No.: US 7,233,371 B2
(45) Date of Patent: Jun. 19, 2007

(54) LIQUID CRYSTAL DISPLAY MODULE FOR NOTEBOOK COMPUTER WITH PARTICULAR PEG AND HOLE STRUCTURE AND METHOD OF ASSEMBLING THE SAME

(75) Inventor: Sam Young Ahn, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/024,223

(22) Filed: Dec. 21, 2001

(65) Prior Publication Data

US 2002/0089618 A1      Jul. 11, 2002

(30) Foreign Application Priority Data

Dec. 22, 2000  (KR) .......................... 10-2000-79990

(51) Int. Cl.
*G02F 1/1333*         (2006.01)
(52) U.S. Cl. ....................................... 349/58
(58) Field of Classification Search .................... 349/58
See application file for complete search history.

(56) References Cited

U.S. PATENT DOCUMENTS 5,134,548 A  *  7/1992  Turner ........................ 362/29
5,786,877 A     7/1998  Yamada
6,309,081 B1 * 10/2001  Furihata ....................... 362/31
6,388,722 B1 *  5/2002  Yoshii et al. .................. 349/62
6,480,245 B1 * 11/2002  Sakamoto et al. ............ 349/59

FOREIGN PATENT DOCUMENTS

| JP | 10-319215 | 12/1998 |
|---|---|---|
| JP | 11-337942 | 12/1999 |
| JP | 2000330478 | 11/2000 |

* cited by examiner

*Primary Examiner*—David Nelms
*Assistant Examiner*—Timothy L. Rude
(74) *Attorney, Agent, or Firm*—McKenna Long & Aldridge LLP

(57) ABSTRACT

A liquid crystal display module and a fabricating method thereof utilizes a reverse direction assembly of the liquid crystal display module to prevent light leakage caused by the movement of a reflector. The liquid crystal display module for the notebook computer includes a liquid crystal display panel in which a liquid crystal is injected between two substrates, a light guide panel converting incident light from a light source to a flat type light and directing the light toward the liquid crystal display panel, a reflector wrapping the bottom surface of the light guide panel, a main support containing the liquid crystal display panel and the light guide panel, and a clamping member disposed in the reflector and the main support for fixing the reflector and the main support.

14 Claims, 4 Drawing Sheets

LIQUID CRYSTAL DISPLAY MODULE FOR NOTEBOOK COMPUTER WITH PARTICULAR PEG AND HOLE STRUCTURE AND METHOD OF ASSEMBLING THE SAME

This application claims the benefit of Korean Patent Application No. P2000-79990 filed on Dec. 22, 2000, which is hereby incorporated by reference as if fully set forth herein.

BACKGROUND OF THE INVENTION

1. Field of the Invention

This invention relates to a liquid crystal display module for notebook computers, and more particularly to a liquid crystal display module and a fabricating method thereof which is capable of assembling a liquid crystal display module in a reverse direction and preventing light leakage caused by the movement of a reflector.

2. Description of the Related Art

Generally, a notebook computer (hereafter NTPC) is manufactured in the size of a notebook for a user to use information while traveling. A liquid crystal display module (hereafter LCM) is used as a display device to display the information in the NTPC.

Referring to FIGS. 1 and 2, a LCM for a NTPC includes a liquid crystal display panel 20, a light guide panel 4 converting light incident from a light source so that the light is directed toward the liquid crystal display panel 20; a reflector 8 for preventing a light leakage through a rear surface of the light guide panel 4; a main support 6 for fixing the light guide panel 4; a bottom cover 2 wrapping a side surface and a bottom surface of the main support 6; and a top case 10 wrapping a side surface of the bottom cover 2 and the main support 6 and wrapping an edge of the liquid crystal display panel 20.

The liquid crystal display panel 20 includes an active area where liquid crystal cells are arranged in an active matrix configuration, and driving circuits 14 for driving the liquid crystal cells in the active area.

More particularly, the liquid crystal display panel 20 includes a thin film transistor for switching liquid crystal cells; a driving circuit 14 for driving the thin film transistor; a lower plate 18 where signal lines 16 connected between a driving circuit 14 and the thin film transistor are mounted on a lower substrate; an upper plate 17 having color filters (not shown) divided by cell areas and spread by means of a black matrix band corresponding to a matrix liquid cells on an upper substrate, and a transparent electrode (not shown) on the surface of the color filters. Liquid crystal (not shown) fills the space between the upper plate 17 and the lower plate 18, which is provided by a spacer (not shown) for maintaining a fixed cell gap.

The light guide panel 4 directs the light incident from a light source (not shown) toward the liquid crystal display panel 20. The reflector 8 reflects the light which is directed toward the main support 6 of the light guide panel 4 back again toward the light guide panel 4 so as to prevent the light leakage.

The main support 6 is molded. An inner side wall of the main support is molded to have a stepped face. The reflector 8, the light guide panel 4, an optical sheet 22 and a back light unit, which includes a lamp housing (not shown), are mounted in the lowest layer of the inside of this main support 6. The liquid crystal display panel 20, to which a upper and a lower polarizers 26 and 24 are attached respectively, is placed on the back light unit.

The optical sheet 22 includes a diffusion sheet for diffusing the light that passes through the light guide panel 4 and a prism sheet for adjusting the direction of the light that passes through the diffusion sheet.

The bottom cover 2 includes a planar bottom surface part and a side surface part which are substantially perpendicular to each other for substantially surrounding the bottom surface and side surface of the main support 6.

The top case 10 generally has the shape of a square band having a planar surface part and a side surface part substantially perpendicular to each other. This top case 10 wraps the edge of the liquid crystal panel 20 and the main support 6.

A description of the conventional assembly order of the LCM for NTPC by steps is as follows.

The order in which the LCM is assembled includes providing the bottom cover 2, the main support 6, the reflector 8, the light guide panel 4, the optical sheet 22, the liquid crystal display panel 20 to which the upper and the lower polarizers 26 and 24 are attached, and finally the top case 10.

Due to the nature of the previously mentioned assembly order, the light guide panel 4 is assembled after assembling the reflector 8, such that the light guide panel 4 is affixed to the top of the reflector 8. Accordingly, the reflector 8 wraps the bottom surface of the light guide panel 4 to prevent the light leakage of the light guide panel 4. As shown in FIG. 3, a part projecting from the side surface of the reflector 8 is inserted into the groove 28 formed in the support main 6.

However, there is a need to make the previously described LCM of the NTPC slim to reduce its thickness and weight. To make the LCM slim, it is conventionally assembled in reverse direction of the previously described assembly order which includes providing the main support 6, the optical sheet 22, the light guide panel 4, the reflector 8, the bottom cover 2 and the top case 10.

Unfortunately, if the conventional LCM is assembled in the reverse direction, movement of the reflector 8 occurs, causing poor assembly yields. Also, due to such the movement of the reflector 8, light leakage occurs.

SUMMARY OF THE INVENTION

Accordingly, the present invention is directed to a liquid crystal display module and a fabricating method thereof that substantially obviates one or more of the problems due to limitations and disadvantages of the related art.

Accordingly, it is an advantage of the present invention to provide a liquid crystal display module and a fabricating method thereof for using a reversed direction assembly order of the liquid crystal display module and preventing light leakage caused by the movement of a reflector.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

In order to achieve these and other advantages of the invention, a liquid crystal display module for a notebook computer according to one aspect of the present invention includes a liquid crystal display panel in which a liquid crystal is injected between two substrates; a light guide panel having incident light from a light source converted to a flat type light wherein the converted light progresses toward the liquid crystal display panel; a reflector wrapping a bottom surface of the light guide panel; a main support containing the liquid crystal display panel and the light guide panel; and a clamping member disposed in the reflector and adjacent the main support for fixing them.

The clamping member includes a protrusion projected to a fixed height from a surface of the main support; and a hole which is formed in the reflector and through which the protrusion of the main support penetrates.

The liquid crystal display module further includes an optical sheet positioned between the liquid crystal display panel and the light guide panel for diffusing the light that passes through the light guide panel and/or adjusting the direction of the light; a bottom cover wrapping the rear surface of the reflector as well as the side surface and the bottom surface of the main support; and a top case wrapping the side surface of the main support and the bottom cover, and wrapping the upper edge of the main support.

The bottom cover includes a hole through which the protrusion of the main support penetrates.

A method of fabricating a liquid crystal display module for a notebook computer includes assembling a liquid crystal display panel, a light source, a light guide panel, a reflector and an optical sheet into a main support. Another aspect of the present invention includes the steps of turning the main support over so that a receiving space of a back light unit and the liquid crystal display panel faces upward; depositing at least one optical sheet in the receiving space of the main support; putting the light guide panel on the optical sheet; and putting the reflector on the light guide panel.

The method further includes the steps of mounting onto the main support, a bottom cover wrapping the rear surface of the reflector and a side surface and the bottom surface of the main support; turning the main support over again; putting the liquid crystal display panel on the twice turned-over main support; and mounting a top case to wrap the edge of the liquid crystal display panel and the side surface of the main support.

In the method, a protrusion is formed from the main support for fixing the reflector.

A first hole is formed in the reflector allowing the protrusion of the main support penetrate through it.

A second hole is formed in the bottom cover allowing the protrusion of the main support penetrate through it.

In the method, the protrusion of the main support is inserted into the first hole when the reflector is put on the light guide panel so that the main support and the reflector are fixed as soon as the reflector is mounted on the main support.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated and constitute part of this specification, illustrate embodiments of the invention, and together with the description, serve to explain the principles of the invention.

In the drawings.

DETAILED DESCRIPTION OF THE PREFERRED EMBODIMENT

Reference will now be made in detail to the embodiments of the present invention, examples of which are illustrated in the accompanying drawings.

Figure 1:
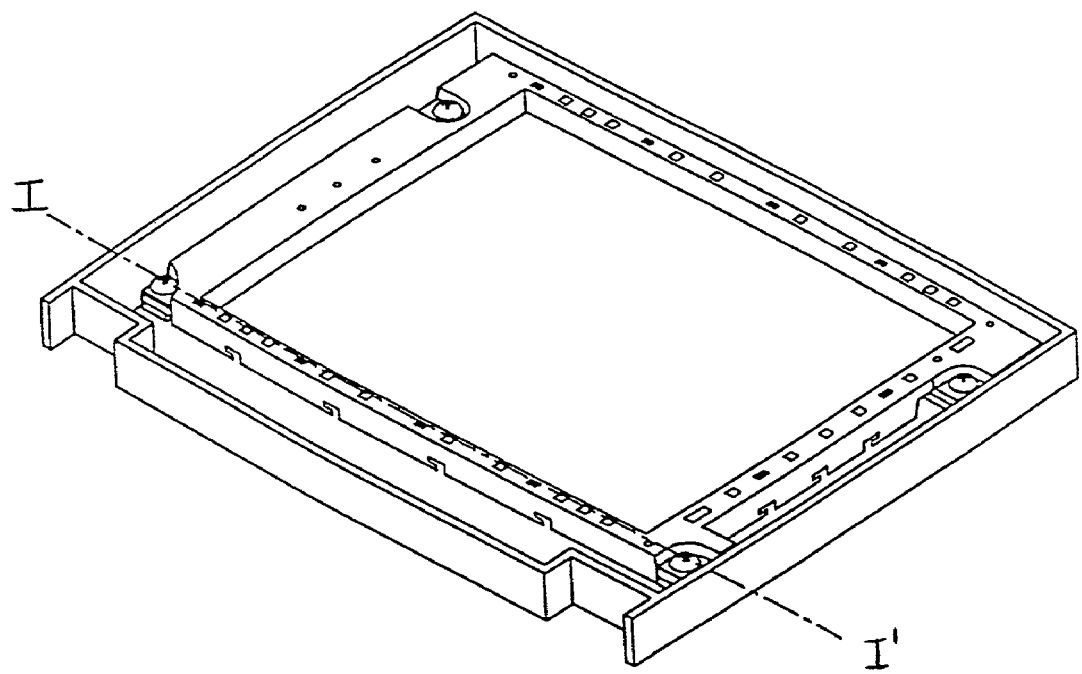
FIG. 1 is a perspective showing a conventional liquid crystal display module for a notebook computer.
Figure 2:
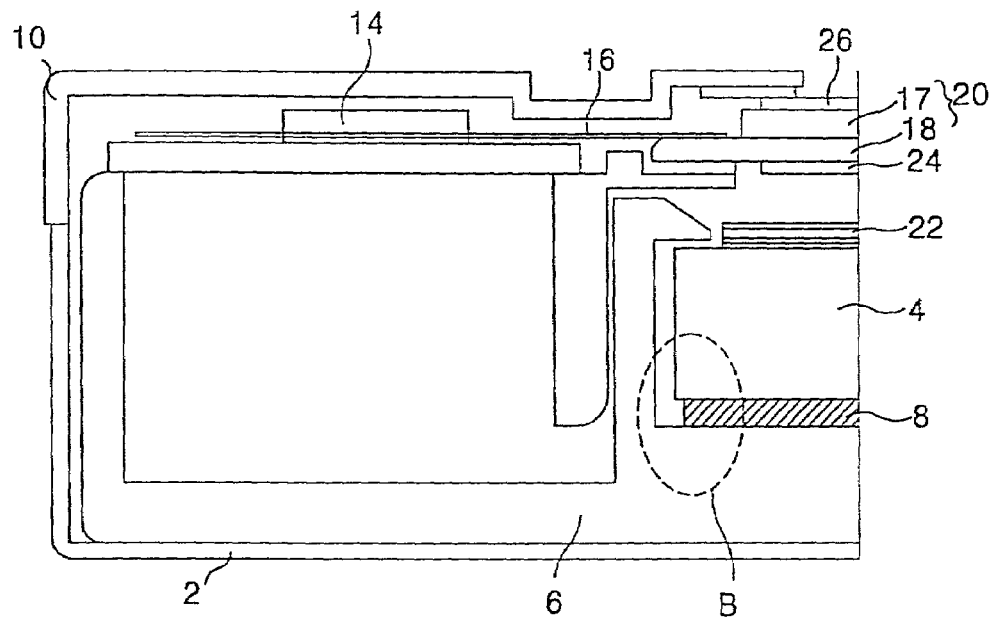
FIG. 2 is a sectional view representing a liquid crystal display module taken along the line I—I shown in FIG. 1.
Figure 3:
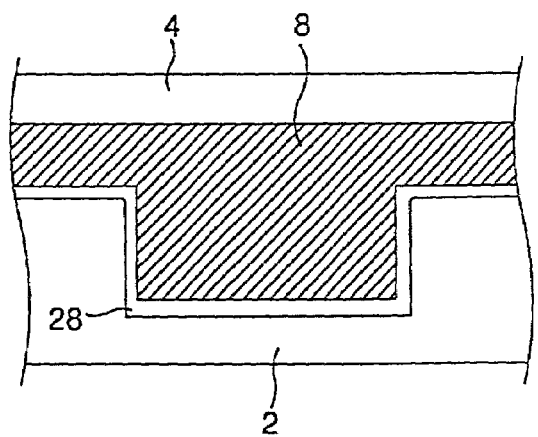
FIG. 3 is a rear view of the magnification of the B part shown in FIG. 2.
Figure 4:
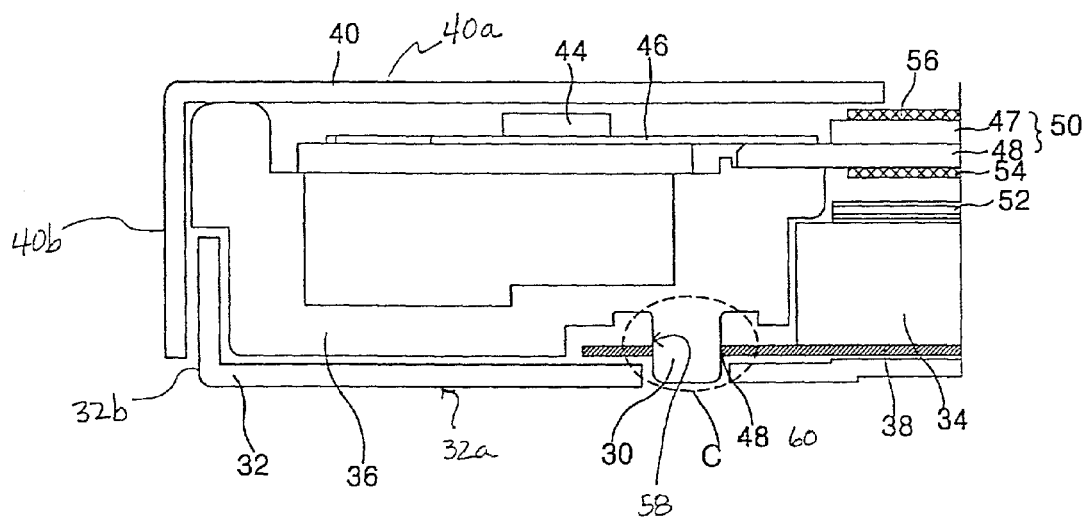
FIG. 4 is a sectional view of a liquid crystal display module for a notebook computer according to the present invention.
Figure 5:
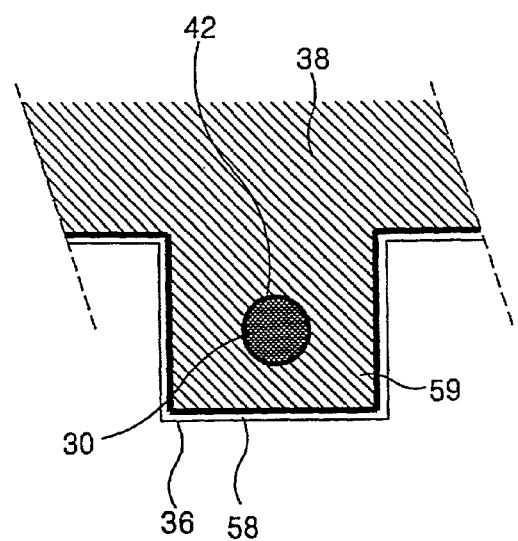
FIG. 5 is a rear view of the magnification of the C part shown in FIG. 4.
Figure 6:
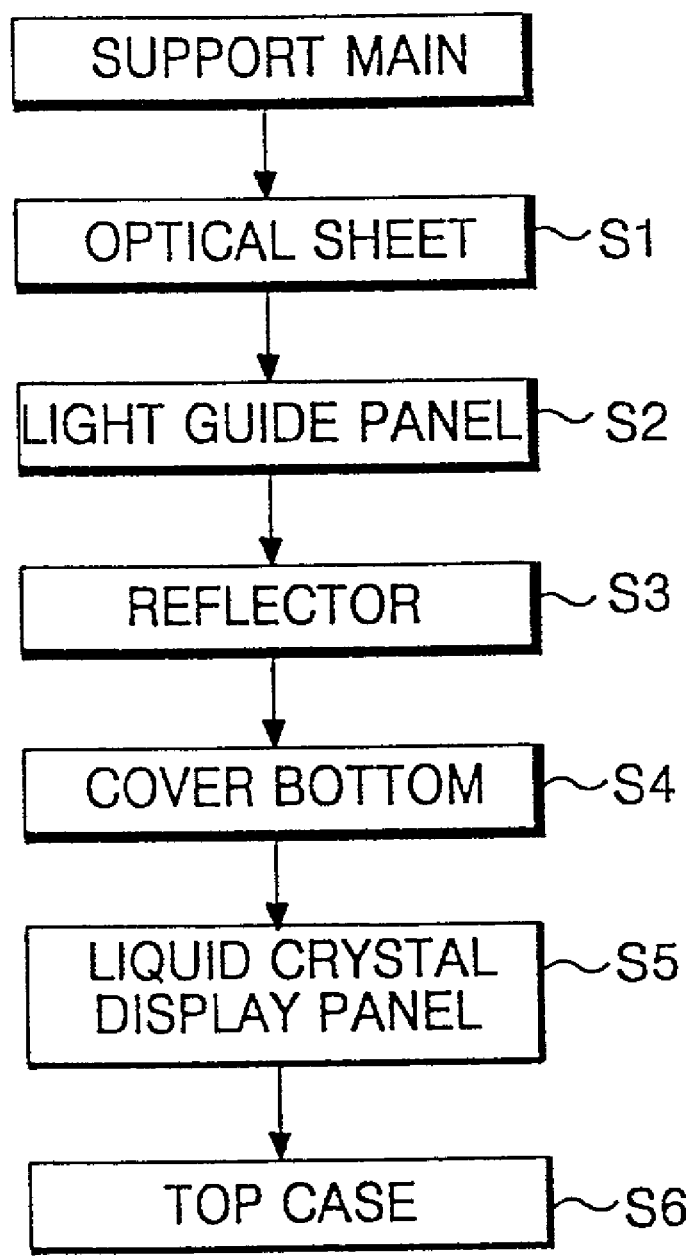
FIG. 6 is a flow chart representing the assembly sequence of a liquid crystal display module for a notebook computer according to the present invention.

Referring to FIGS. 4 and 5, a liquid crystal display module for a notebook computer according to the present invention includes a liquid crystal display panel 50, a light guide panel 34 having light incident from a light source directed toward the liquid crystal display panel 50, a reflector 38 for preventing light leakage through a rear surface of the light guide panel 34, a main support 36 for fixing the light guide panel 34, a bottom cover 32 wrapping a side surface and a bottom surface of the main support 36, and a top case 40 wrapping a side surface of the bottom cover 32 and the main support 36 and wrapping the edge of the liquid crystal display panel 50.

The liquid crystal display panel 50 includes an active area where liquid crystal cells are arranged in an active matrix configuration, and driving circuits 44 for driving the liquid crystal cells in the active area.

The liquid crystal display panel 50 includes a thin film transistor for switching liquid crystal cells; a driving circuit 44 for driving the thin film transistor; a lower plate 48 where signal lines 46 connected between a driving circuit 44 and the thin film transistor are mounted on a lower substrate; a upper plate 47 consisting of color filters (not shown) divided by cell areas and spread by means of a black matrix band corresponding to the matrix liquid cells on an upper substrate, and a transparent electrode (not shown) on the surface of the color filters; and liquid crystal (not shown) formed to fill in the space between the upper plate 47 and the lower plate 48, which is provided by a spacer (not shown) securing a fixed cell gap.

The light guide panel 34 directs the light incident from a light source (not shown) toward the liquid crystal display panel 20.

Between the liquid crystal display panel 50 and light guide panel 34, there is deposited an optical sheet 52 consisting of a diffusion sheet for diffusing the light that passes through the light guide panel 34 and a prism sheet for adjusting the direction of the light that passes through the diffusion sheet.

The reflector 38 reflects the light which progresses toward the main support 36 from the light guide panel 34, back again toward the light guide panel 34 so as to prevent the light leakage. Also, the reflector 38 is extended toward the main support 36 thereby preventing the movement of the reflector upon assembly. In the extended reflector 38, a first hole 60 is formed.

The main support 36 is molded such that an inner side wall of the main support has a stepped surface. These stepped surface has a structure different from the conventional structure and includes a stepped face for supporting the optical sheet 52 and a stepped face for supporting the light guide panel 34.

Also, a clamping member including a guide surface 58 of a protrusion 30, e.g., a boss, of the main support 36 engages a hole 60 in the reflector 38 and which fixes the reflector 38 in the horizontal direction. Thereby, reverse direction assembly becomes possible for making the LCM slim.

The protrusion 30 of the main support 36 with a fixed height is projected on a corresponding location to the first hole 60 formed in the reflector 38. The protrusion 30 is projected in the manner such that its height is not greater than the sum of a thickness of the reflector 38 and a thickness of the bottom cover 32. The shape of the protrusion 30 is not limited to a boss, but may be of any shape including a cross section that is substantially rectangular, triangular, oval, etc.

The bottom cover 32 includes a substantially planar surface part 32a and a side surface part 32b which are substantially perpendicular to each other for wrapping the bottom surface and side surface of the main support 36. Also, in the bottom cover 32, there is formed a second hole 42 through which the protrusion 30 formed in the main support 36 penetrates.

The main support 36, the reflector 38, the light guide panel 34, the optical sheet 52 and a back light unit, which includes a lamp housing (not shown) are mounted on this bottom cover 32, and the liquid crystal display panel 50, to which a upper and a lower polarizers 56, 54 are attached, respectively, are deposited thereon.

The top case 40 is substantially in the shape of a square or rectangular band having a substantially planar surface part 40a and a side surface part 40b substantially perpendicular to each other. This top case 40 wraps the edge of the liquid crystal display panel 50, and a side surface of the main support 36 and the bottom cover 32.

Likewise, an explanation of the assembly sequence of the LCM for the NTPC according to the present invention with the reference to FIG. 4 is as follows.

The LCM is completed by assembling, in order, the main support 36, the optical sheet 52, the light guide panel 34, the reflector 38, the bottom cover 32, the liquid crystal display panel 50 and the top case 40.

More particularly, the main support 36 is configured to have a receiving space facing upward. Then, the optical sheet 52 is put on the main support 36. (S1).

Next, the light guide panel 34 is put on the optical sheet 52 and the reflector 38 is put on the optical sheet 52. (S2, S3) At this moment, the protrusion 30 formed in the main support 36 penetrates the first hole 60 formed in the reflector 38.

Consequently, there is no movement in the reflector 38 due to the presence of the protrusion 30 of the main support 36.

Consequently, the reflector 38 wraps the bottom surface of the light guide panel 34.

Subsequently, the bottom cover 32 is mounted on the main support 36 in the manner of wrapping the rear surface of the reflector 38, and the rear surface and the side surface of the main support 36. (S4) At this moment, the protrusion 30 of the main support 36 penetrates the second hole 42 formed in the bottom cover 32. The protrusion 30 penetrating the second hole 42 is less than the sum of the thickness of the bottom cover 32 and the reflector 38, so that it does not extend beyond the rear surface of the bottom cover 32.

Then, the main support 36 with its bottom and side surfaces wrapped by the bottom cover 32, is turned over to put the liquid crystal display panel 50 thereon. (S5)

Subsequently, the LCM is completed by assembling the top case 40 wrapping the side surface of the bottom cover 32 and the edge of the liquid crystal display panel 50. (S6)

Thus, in the LCM according to the embodiment of the present invention, the left side and the right side of the reflector 38 are fixed by projecting the protrusion 30 with a fixed height from the main support 36 so that the protrusion 30 penetrates the first hole 60 formed in the reflector 38 and the second hole 42 formed in the bottom cover 32. Thereby, the movement of the reflector 38 is prevented upon the LCM assembly.

Also, the protrusion 30 of the main support 36 comes up as much as the thickness of the bottom cover 32 to prevent leakage of light, which occurs in conventional LCMs because of the movement of the reflector 38 caused by vibration and shock.

As described above, the protrusion 30 is formed in the main support 36. The reflector 38 and the bottom cover 32 have holes formed therein for receiving the protrusion. Movement of the reflector is prevented, thereby preventing light leakage while attending to the demand for its slimness.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module for a notebook computer, comprising:
   a liquid crystal display panel;
   a light guide panel converting incident light from a light source to a flat type light, wherein the converted light is directed toward said liquid crystal display panel;
   a main support containing the liquid crystal display panel and the light guide panel; and
   having a protrusion projecting a fixed distance from a surface of the main frame; a reflector wrapping a bottom surface of the light guide panel and having a first hole to receive the protrusion of the main support; and
   a bottom cover wrapping a rear surface of the reflector and side surface and a bottom of the main support and having a second hole to receive the protrusion of the main support,
   wherein the protrusion of the main support penetrates the second hole in the a bottom cover via the first hole in the reflector.

2. The liquid crystal display module according to claim 1, wherein said clamping member includes:
   a protrusion projecting a fixed distance from a surface of said main support; and
   a hole formed in the reflector receiving said protrusion.

3. The liquid crystal display module according to claim 2, wherein the protrusion includes a boss.

4. The liquid crystal display module according to claim 1, further comprising:
   an optical sheet between said liquid crystal display panel and said light guide panel diffusing light passing through said light guide panel and adjusting a direction of the light;
   a top case wrapping a side surface of said main support and said bottom cover, and wrapping an upper edge of said main support.

5. The liquid crystal display module according to claim 4, wherein the protrusion includes a boss.

6. The liquid crystal display module according to claim 4, wherein the height of the protrusion is not greater than the sum of a thickness of the reflector and a thickness of the bottom cover.

7. The liquid crystal display module according to claim 1, wherein said main support includes a guide surface engaged with a part of the reflector fixing said reflector in the horizontal direction.

8. A liquid crystal display module for a notebook computer, comprising:
- a main support; having a protrusion extending a predetermined distance from a surface of the main support;
- a liquid crystal display panel adjacent to said the main support, the light guide panel having a first surface; and
- a reflector having a second surface adjacent to said the first surface, the reflector includes a first hole for receiving the protrusion in the second surface; and
- a bottom cover being adjacent to the reflector and the main support, the bottom cover includes a second hole for receiving the protrusion.

9. The liquid crystal display module according to claim 8, further comprising a liquid crystal display panel adjacent to said light guide panel and main support.

10. The liquid crystal display module according to claim 8, wherein the height of the protrusion is not greater than the sum of a thickness of the reflector and a thickness of the bottom cover.

11. The liquid crystal display module according to claim 8, wherein:
- a portion of the reflector is laterally extended away from the light guide panel; and the first hole is included in the portion of the laterally extended portion of the reflector.

12. A liquid crystal display module for a notebook computer, comprising:
- a bottom cover;
- a light guide panel;
- a reflector adjacent to the bottom cover and the light guide panel, the reflector including a first hole; and
- a main support being adjacent to the bottom cover; and having a protrusion extending a predetermined distance from a surface of the main support and engaged with the first hole;
- wherein the bottom cover includes a second hole for receiving the protrusion.

13. The liquid crystal display module according to claim 12, wherein the height of the protrusion is not greater than the sum of a thickness of the reflector and a thickness of the bottom cover.

14. The liquid crystal display module according to claim 12, wherein:
- a portion of the reflector is laterally extended away from the light guide panel; and the first hole is included in the portion of the laterally extended portion of the reflector.

* * * * *